United States Patent [19]

Frye

[11] 4,344,128
[45] Aug. 10, 1982

[54] AUTOMATIC PROCESS CONTROL DEVICE

[76] Inventor: Robert C. Frye, Rte. 2, Box 255, Winchester, Ky. 40391

[21] Appl. No.: 150,935

[22] Filed: May 19, 1980

[51] Int. Cl.³ .................. G06G 7/66; G05B 5/00; G05B 7/02; G05B 11/40

[52] U.S. Cl. .................. 364/183; 318/561; 318/611; 364/153; 364/161; 364/177; 364/181

[58] Field of Search .............. 364/114, 115, 118, 105, 364/117, 510, 148, 153, 161, 176, 177, 183; 318/611, 591, 561

[56] References Cited

U.S. PATENT DOCUMENTS

| | | | |
|---|---|---|---|
| 2,949,273 | 8/1960 | Roper et al. | 364/137 |
| 3,348,032 | 10/1967 | Clardy et al. | 364/139 |
| 3,350,577 | 10/1967 | Moore et al. | 307/254 |
| 3,454,787 | 7/1969 | Gelernter | 328/151 X |
| 3,460,000 | 8/1969 | Kiffmeyer | 307/350 |
| 3,540,001 | 11/1970 | Gormley et al. | 364/114 X |
| 3,544,909 | 12/1970 | Rosso | 328/147 |
| 3,644,897 | 2/1972 | McCrea | 364/148 |
| 3,694,633 | 9/1972 | Lejon | 364/115 |
| 3,749,944 | 7/1973 | Luebrecht | 307/350 |
| 3,940,594 | 2/1976 | Bleak et al. | 364/118 X |
| 3,959,667 | 5/1976 | Boyd | 328/151 X |
| 4,008,386 | 2/1977 | Ross | 364/118 |
| 4,068,138 | 1/1978 | Miyakawa et al. | 307/354 X |
| 4,167,679 | 11/1979 | Leyde et al. | 364/118 X |
| 4,236,202 | 11/1980 | Giles et al. | 364/118 X |

*Primary Examiner*—Joseph F. Ruggiero

*Attorney, Agent, or Firm*—James R. Higgins, Jr.

[57] ABSTRACT

Automatic Process Control Device having input transistors to receive process and set point signals; a subtractive amplifier to compare the process and set point signals and produce one of two amplified deviation signals which are limited to maximum values by zener diodes; capacitors to receive, time-integrate and store the amplified and limited deviation signals, and produce a neutral output if the time-integration of the amplified and limited deviation signals is in balance, and one of two trigger signals if the time-integration of the amplified and limited deviation signals is positive or negative; and relay switches connected to discharging circuits and in series with zener diodes to receive the trigger signals and operate a controlling device upon the process to urge the process toward its desired set point, and simultaneously produce a corresponding tripping signal which urges the capacitors toward a status to produce the neutral output, such that as the controlling device is operating upon the process the Automatic Control Device is simultaneously being urged toward its neutral position, and the response of the controlling device is time-integrated to the accumulative deviation of the process. In use, the disclosed Automatic Control Device virtually eliminates "hunting", and it can also accomodate and control extreme and sudden changes ("bumping") in either the process variable or the set point without damage to the Automatic Process Control Device or its operation.

23 Claims, 5 Drawing Figures

AUTOMATIC PROCESS CONTROL DEVICE

BACKGROUND AND NECESSITY OF THE INVENTION

One system of process control known in the prior art and now in general use is disclosed in U.S. Pat. No. 2,949,273, issued Aug. 16, 1960 to C. G. Roper, et al. These presently-available devices are designed to use final controlling means of the "spring loaded" type, in which the force of a spring tending to decrease the process variable (e.g., close a valve) is balanced by a force or "demand" proportional to a variable output or signal from the controller, which force tends to increase the process variable (e.g., open a valve). The output signal from the controller is ramped up or down by negative or positive deviations of the process variable as compared to the set point of the process, and the controller output signal remains constant if there is no deviation of the process variable from the set point.

Thus, in present control devices, the position of the controlling means (e.g., openness of a valve) is proportional to the magnitude of the output signal from the controller. Certain refinements to available control circuitry, known as "rate", "reset" and "proportional band" have added to the sensitivity and responsiveness of the presently available systems, but these improvements have not eliminated the shortcomings and operational problems of the current systems in certain applications.

For example, the presently available spring-loaded control devices have not been successful in controlling largesized control means (such as large valves), which cannot be spring-loaded but rather must be power-operated in both directions by electric, hydraulic or pneumatic means. To adapt the presently available control devices to such power-operated control means, a position-sensing circuit is employed to measure and compare the output or demand signal from the controller to the position of the control means (e.g., the openess of the valve) as measured by a position-measuring device, and to cause the control means to operate when their difference exceeds a predetermined tolerance or "dead band". The demand from the controller must move out of the deadband of the positioning circuitry before any signal is developed to operate the control means (e.g., open or close a large valve).

Further compounding such problems is the comparatively slow operating speed of power-operated control devices, such as electric gear motors, which results in such time lag from receipt of deviation signal to actual physical control activity that the control means does not begin to control the process variable soon eough after a deviation is detected, so that the deviation remains unchecked for a period of time. Because the deviation of the process variable has not been corrected, the deviation amplifier sends stronger and stronger position demand signals (called "ramping up" the demand signal) to the control means, often stronger than desired or required for effective control.

This stronger than desired control signal caused by the ramping up of the demand signal often causes the control means to apply a corrective force of longer duration than desired to the controlled variable, resulting in an over-correction of the process variable.

As the value of the (over-corrected) process variable passes through zero deviation and actually becomes an opposite deviation, an opposite control force should actually be called for. However, because the demand signal has been ramped up too far, the control means continues to apply the original controlling force (e.g., continues to call for opening the valve) when the opposite control force (i.e., close the valve) is actually required. This process of constant ramping up and over-correcting results in a process control anomaly known in the trade as "hunting". Hunting can be reduced somewhat by decreasing the sensitivity of the control system, but over-all control accuracy is sacrificed.

Another undesirable process control anomaly inherent in presently available process control systems is a phenomenon termed "bumping". Bumping occurs when a sudden and significant change in the value of the process variable occurs, such as a large change in flow rate, or the process set point is changed, such as changing from automatic control to manual without having changed the manual set point to approximate the expected new process set point value, or starting the process in the automatic control mode without first manually adjusting the process up to approximately the desired set point. These kind of significant changes in the process control set point or the process variable result in shock to the control device and severe hunting, referred to in the trade as bumping.

The present invention operates independently of the position of the control means and therefore there is no need for any positioner circuitry, even on the largest power-operated control devices. Thus, a key advantage of the present invention is that it accurately and uniformly controls a given process variable with virtual elimination of hunting, and sudden and significant changes in the process variable, and sudden changes in the process set point can be accomplished without bumping. The response of the control means is rapid and continuous where there is a large process deviation, and gradual, intermittent, proportional and accumulative where there are smaller process deviations. The process is controlled much more uniformly than heretofore possible, and the process settings may be manually or automatically "dialed" to higher or lower settings without losing control. In addition, there is no requirement for the complicated rate, reset or proportional band circuitry that is required to render the presently-available process control devices to an acceptable level of sensitivity. Further, the difficulty attendant to placing these difficult to understand and difficult to adjust circuits in the hands of plant operating personnel is eliminated with the present invention.

SUMMARY OF THE INVENTION

This invention relates to a new control device for use in a system of automatic process control, whereby any measurable process variable can be more uniformly controlled than is possible with presently available systems.

It is an object of the present invention to provide, especially in large power-operated control systems, a more uniform and responsive control system so as to eliminate process control anomalies known in the trade as "bumping", "hunting", and slow response. This is accomplished by means of the disclosed control device in which the controlled variable is measured electrically, compared to a pre-determined value (process control set point) by means of a subtracting circuit to determine the deviation of the controlled variable from the process set point, the deviation is converted into a signal which is amplified by an amplifier similar to a push-pull type into an electric signal proportional to the amount of deviation of the controlled variable from the desired value (set point) with the amplifier output going through zero at zero process variable deviation, and the amplification of the deviation signal being limited or "clipped" to a set maximum positive and negative output current by means of Zener diodes and bias resistors on the amplifier output transistors with the gain of the amplifier variable within the maximum positive or negative output current values clipped as aforesaid.

The output of the deviation amplifier is fed into a bank of capacitors connected in series across a voltage-regulated power supply, which capacitors integrate the output of the deviation amplifier to produce a varying voltage across said capacitors.

A system of Zener diodes, resistors and relays provide circuits to start and stop either the positive or negative discharge or "trigger" signals from the capacitors when the voltage at the capacitors' center tap point reaches predetermined threshold values above or below a predetermined mid point value. Further, the relays are so arranged that the controlling means will be operated to increase the process variable simultaneously with the flow of positive trigger signal and operated to decrease the process variable simultaneously with the flow of negative trigger signal.

The resistance of the capacitor discharging circuits must be such that their discharge values substantially equal the maximum positive or negative output signal from the deviation amplifier. In this way, if the deviation is outside the range of limited response of the device, the control means will work constantly to reduce the deviation and the capacitors will not discharge, since the amplifier output will make up for the discharging signals, thus keeping the control means operating constantly so long as the process deviation is outside of the limited response range. On the other hand, if the process variable is within the limited response range, but nevertheless above or below the set point, the capacitors will discharge intermittently, the time of operation being proportional to the amount of deviation of the controlled variable from the desired set point.

It is an important component of the present invention to select the capacitors, the resistance of the "tripping" circuits and the "clipped" values of maximum deviation amplifier output (positive or negative) so that the minimum time of discharge on the capacitors will be equal to or greater and not less than the minimum time of application of power to which the control means will respond.

There is also included in the present invention a Relay, activated by a system demand circuit (such as a float switch), which when activated will activate said relay causing the system to operate at its pre-selected control points, and which when de-activated will cause the control means to go to full shut down position, and disconnect the control device disclosed herein from its power source.

It is another object of the invention to be able to practice the invention by using standard components, without the need for requiring special components. As more fully explained below, this invention can be fully practiced in industry or research by utilizing standard electrical components readily available from commercial sources.

While the present invention may be related to and utilized on any measurable and controllable process variable, the invention disclosed herein is best suited for the operation and control of large power-operated control means, such as valves regulating waterflow. It is to be understood, of course, that the principles of operation herein explained are not limited to valve control, but are equally applicable to any number of other control means.

DETAILED DESCRIPTION OF PREFERRED EMBODIMENT

Figure 1:
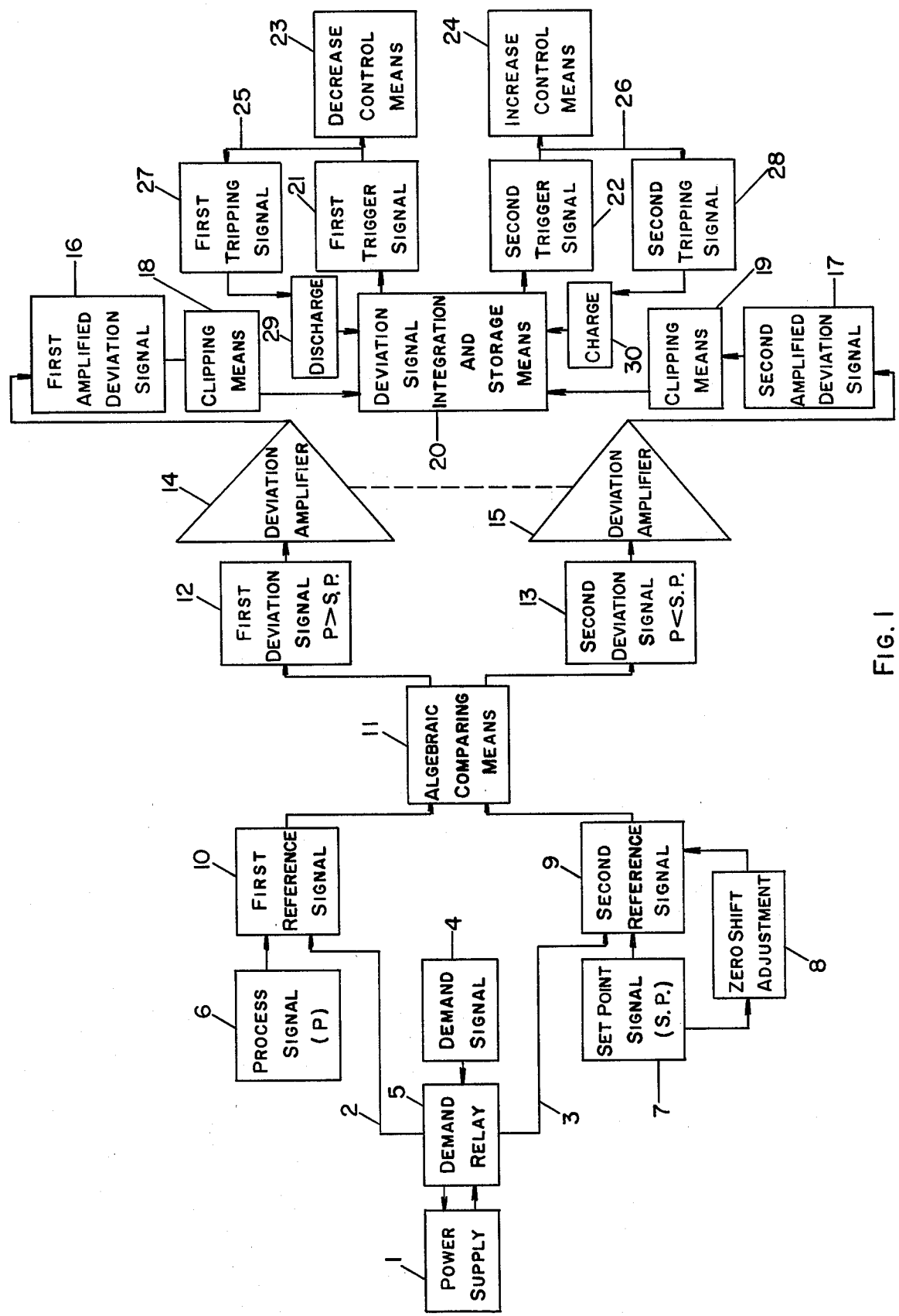
FIG. 1 is a block diagram showing a schematic representation of the method of operation of preferred embodiment of the invention.

Reference to FIG. 1 can illustrate the method of operation of the disclosed invention.

The device's power supply 1 is shown connected via a Demand Relay 5, or similar means, to an external Demand Signal 4. When the process is needed or desired to be operated, Demand Signal 4 is activated, which activates Relay 4 which connects the Power Supply Leads, 2 and 3, to the disclosed control device.

Input signal 6, representing the value

Input signal 6, representing the value of a process variable, is converted into a First Reference Signal 10, and Set Point Signal 7, representing the desired value of the process variable is converted into Second Reference Signal 9. Zero Shift Adjustment Device 8, ensures that the desired value of the set point signal is converted to said Second Reference Signal.

Comparing means 11, algebraically compare said First and Second Reference Signals and produce one of two discrete deviation signals, the first of which, 12, is produced if the value of the process is greater than the set point, and second of which, 13, is produced if the process is less than the set point. The first and second deviation signals are each amplified by deviation amplifier 14, 15, to produce first and second amplified deviation signals 16, 17, depending upon the relation of the process signal to the desired set points signal.

The value of each amplified deviation signal is "clipped" at 18, 19, or limited to a maximum pre-determined value, and each "clipped" deviation signal is fed into deviation signal integration and storage means 20, which time-integrates said clipped first and second amplified deviation signals to produce, when one or the other stored value of said amplified deviation signals exceeds the storage capacity of the storage means, one of two trigger signals, 21 and 22, time-reflective of the accumulative time which the process signal exceeds the set point signal or vice-versa.

The storage capacity or discharge value of the storage means is sized to match the clipped value of the amplified deviation signals, so that the storage means cannot be overcharged. The storage means discharge value is also sized so that it has a "neutral range", such that, when the process is at its desired value, the storage means discharge value is not exceeded by either of said clipped amplified deviation signals, or said neutral range is maintained by tripping signals as more fully set out below.

Trigger signals 21 and 22 are time-reflective of the amount of time the process signal exceeds the set point signal, or vice-versa. Thus, when the process signal is constantly above the set point of the process, trigger signal 21 is constantly available; similarly, when the process signal is constantly below the set point, trigger signal 22 is constantly present. When the process signal is variably above or below the set point, trigger signal 21 or 22 is produced, depending upon the cumulative amount of time which the process is above or below the set point. If the positive deviations substantially equal the negative deviations, no trigger signal is produced because the time integrated difference between the process and the set point is substantially zero.

Trigger signals 21 or 22 actuate control means 23, 24 and also simultaneously produce respective first and second tripping signals 27, 28, which are connected via leads 25, 26, back to the Amplified Deviation Signal Integration and Storage Means. As trigger signal 21 actuates the control means in a first direction 23, first tripping signal 27 is produced which simultaneously causes Deviation Signal Integration and Storage Means 20 to discharge 29, thereby urging said Deviation Signal Integration and Storage Means toward its neutral position. Likewise, as trigger signal 22 operates control means in a second and opposing direction 24, a second tripping signal 28 simultaneously causes the deviation signal integration and storage means to charge 30, thereby also urging, albeit from an opposing direction from that of 29, said deviation signal integration and storage means toward its neutral position.

Thus, the time-reflective trigger signals produced operate upon control means in a manner time reflective of cumulative process deviations, and simultaneously produce tripping signals, also time-reflective, so that said deviation signal integration and storage means is urged toward its neutral position. Thus, the disclosed device is urged toward a neutral position (process set point) by opposing time-reflective signals, thus preventing overriding of the control device known as "hunting".

Figure 2:
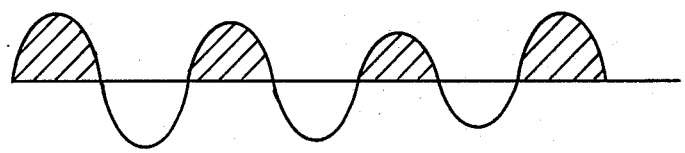
FIGS. 2 and 3 are graphical representations of expected process variations, to serve as examples of the manner in which the present invention will operate to control the depicted conditions.
Figure 3:
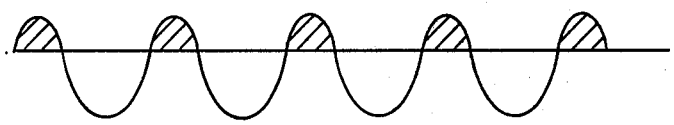

Reference to FIGS. 2 and 3 can explain how the present invention would respond to and operate to control certain process variations. In a process as depicted in FIG. 2, the positive deviations approximately equal the negative deviations. The presently available control systems will likely produce hunting, depending upon the magnitude of the variations from the process set point. The present invention, however, will not hunt. Since the present invention operates the controlling means on a time basis proportional to the amount of demand, and since here the accumulative time of positive deviations are equal to the accumulative time of the negative deviations, the control means (e.g., valve) will not operate and the process will remain in control.

In FIG. 3, the accumulative time of the negative deviations exceed the accumulative positive deviations; therefore, as explained above, the charge on deviation signal integration and storage means 20 will drop, causing second trigger signal 22 to be produced to activate control means 24 (e.g., open a valve), and simultaneously produce second tripping signal 28 to recharge 30, and urge said deviation signal integration and storage means 20 toward its neutral position.

Figure 4:
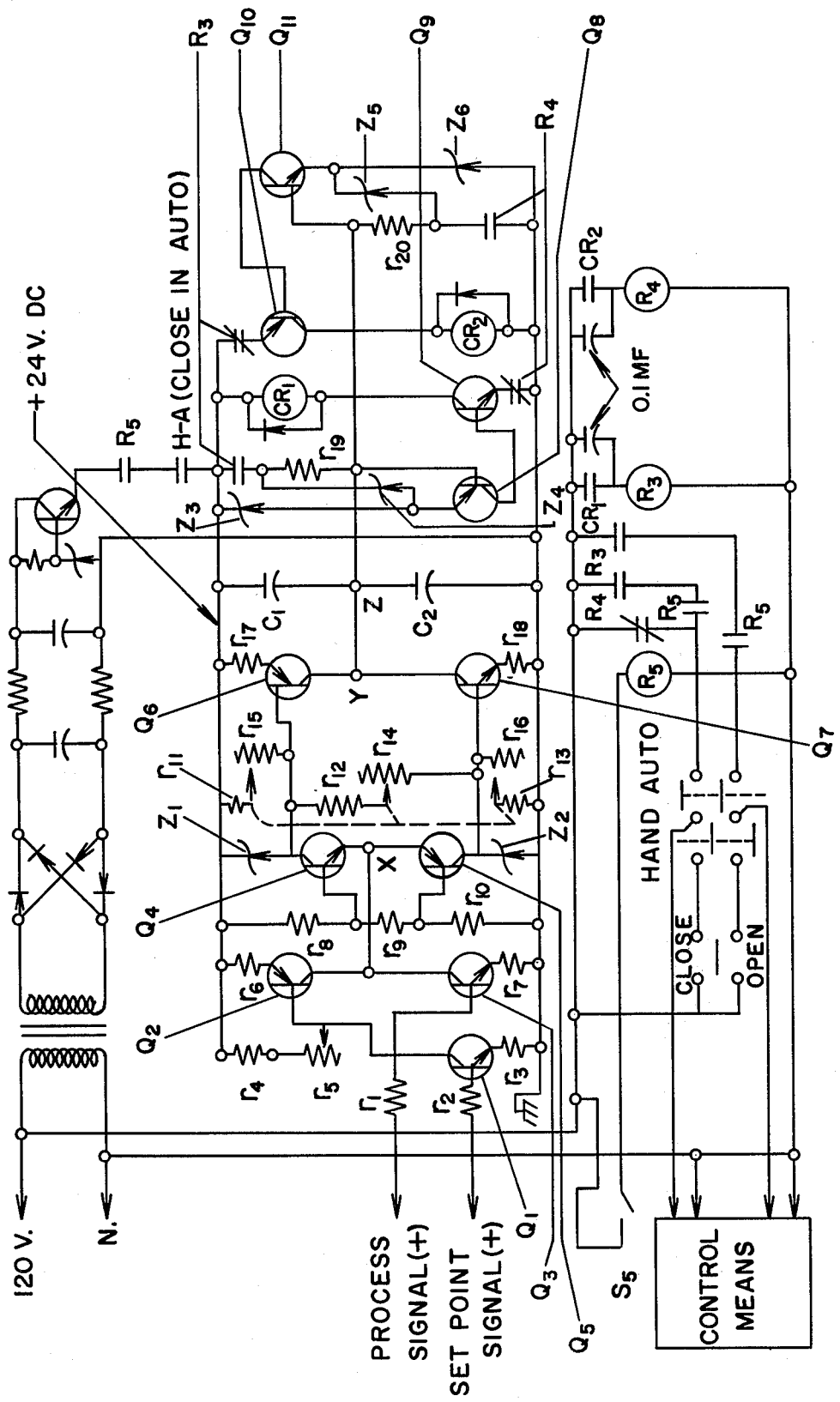
FIG. 4 is a schematic wiring diagram showing the presently preferred embodiment of the invention.

Referring now to FIG. 4, input circuits take the set point and process variable signals of, e.g. 1–5 volts D.C., and resistors $r_1$ and $r_2$, for example 1000 ohms, limit the current in the said input circuits to avoid or minimize the event that excess input currents might disturb the voltage signals produced by the measuring devices. A transistor, $Q_1$, with an emitter resistor $r_5$, for example 1000 ohms, generates a 1–5 milliamp current proportional to the set point signal, and transistor, $Q_2$, will reverse the bias of transistor $Q_1$, and generate a current equal to the output of transistor $Q_1$. A zero-shift-adjustment device, $r_4$ and $r_5$, connected in series so as to provide a variable resistance bias to the base of transistor $Q_2$, is included so as to prevent the system balancing out at a value other than the desired process setpoint. Making the base bias resistance of transistor $Q_2$ variable between, for example, 950 ohms and 1.050 ohms will make it possible to adjust out any "zero drift" which occurs proportional to the rate of the process variable. Another transistor, $Q_3$, is arranged to emit a current of 1–5 milliamps proportional to the process variable signal. Thus, as the process and set point signals separately enter the invention control system, they are converted by transistors $Q_2$ and $Q_3$ respectively to currents of from 1–5 milliamps, which can be compared for process control purposes as described in more detail below. A resistance bridge, here shown as three resistors connected in series, $r_8$, $r_9$, and $r_{10}$, for example with values of 24,000 (24K) ohm, 1,000 ohm, and 24,000 (24K) ohm respectively, biases the bases of transistors $Q_4$ and $Q_5$ at, for example, 12.25 and 11.75 volts, respectively.

If the current output from transistor $Q_2$ (set point signal) exceeds the current from transistor $Q_3$ (process signal) the voltage at Point X on the resistance bridge will increase, causing transistor $Q_5$ to generate a current proportional to the algebraic difference between $Q_2$ and $Q_3$, which current output from $Q_5$ reduces the voltage at Point X. Likewise, if transistor current from transistor $Q_3$ exceeds transistor $Q_2$, transistor $Q_4$ will produce current sufficient to equalize the algebraic difference between $Q_2$ and $Q_3$.

Therefore, the current through transistor $Q_4$ and $Q_5$ is proportional to the difference between the set point signal and the process signal. Thus, if the process deviation is positive from the set point, a deviation current will be generated through transistor $Q_5$, and if the process deviation is negative, deviation current is produced by transistor $Q_4$. These deviation currents are amplified through an amplifier similar in principle to a push-pull amplifier with amplification resistances comprising, for example, $r_{11}$ and $r_{13}$, for example 2000 ohm resistors and $r_{14}$ and $r_{15}$, for example 4000 ohm rheostats in series. With the values given by way of example, the gain of the amplifier can be varied from 2:1 to 6:1. See also FIG. 5 for a more detailed representation of the relationship between amplifier output and deviation signal at various gain settings.

At Y, zero bias resistance keeps the bases of transistors $Q_6$ and $Q_7$ at 0.5 volts at zero process deviation. The zero bias resistance shown comprises $r_{12}$, for example a 100,000 ohm (100K) resistor and $r_{14}$, for example a 200,000 ohm (200K) rheostat arranged in "gang" fashion with $r_{15}$ and $r_{16}$, for example 4,000 ohm, rheostats of the amplifier. This keeps the zero bias on the transistors $Q_6$ and $Q_7$ as aforesaid, regardless of the setting of the amplifier Gain adjustment.

Zener diodes, are provided at $Z_1$ and $Z_2$, selected so that they break down at, for example, 6.5 volts, which will limit the current through transistors $Q_6$ and $Q_7$ to a maximum of, in this example, 6.0 milliamps.

A bank of one or more capacitors, here comprising two capacitors, $C_1$ and $C_2$, each of 500 microfarad capacity, for example, is connected in series across a regulated power supply, here shown as 24 volts D.C., so that the voltage of the center tap of said capacitors, labeled Point Z, will vary above or below the midpoint of the power supply voltage, here 12.0 volts, according to the time integral of the amplifier output current in accordance with the general formula, $$\text{Voltage} = (1/c) \int I_{dev} dt,$$

where c means capacitance of the capacitor $C_1$ or $C_2$, $I_{dev}$ means the deviation current output of the Amplifier, and Voltage means the center tap voltage of the capacitors $C_1$ and $C_2$, as represented in FIG. 1 at Point Z. The two capacitors $C_1$ and $C_2$ so integrate the current output of transistors $Q_6$ and $Q_7$ so that the voltage at Point Z is equal to the time integral of the current from transistor $Q_6$ minus the time integral of the current from transistor $Q_7$.

If the voltage at Point Z is equal to or less than, for example, 8.5 volts, a Zener diode $Z_3$, for example 15 volts, conducts and produces a "triggering current" which activates transistor $Q_8$ the output of which in turn activates transistor $Q_9$, which in turn operates sensitive coil reed relay, $CR_1$. $CR_1$ operates Relay, $R_3$, a standard 120 volt two pole double-throw relay. $R_3$ closes the circuit to send a signal to the control device, and also disconnects the capacitor discharging circuits and causes, for example, a 6.0 milliamp charging current from the positive side of the 24 volt D.C. power supply to pass through $r_{19}$, for example 2,500 ohms, to Point Z, thereby charging said capacitors, $C_1$ and $C_2$, and causing the voltage at Point Z to increase. $R_3$, when activated, also simultaneously causes the triggering current to pass through Zener diode $Z_4$, for example, 14 volts, instead of $Z_3$, thereby maintaining the conditions of: Operating the control means, disconnecting the capacitor discharging circuits and charging the capacitors, $C_1$ and $C_2$, until the voltage at Point Z has been increased, for example, to 9.5 volts and Zener diode $Z_4$ ceases to conduct.

If the voltage at Point Z equals or is greater than, for example, 15.5 volts, a Zener diode $Z_6$, for example 15 volts, conducts and produces a second triggering current, which activates transistor $Q_{10}$, the output of which activates transistor $Q_{10}$, which in turn activates sensitive coil reed relay, $CR_2$, which in turn operates Relay $R_4$, a standard 120 volt two pole double-throw relay. $R_4$ closes the circuit to send a signal (opposite to the signal from $R_3$) to the control device, and causes, in this example, a 6.0 milliamp discharging current from the negative side of the aforesaid Power Supply to pass through $r_{20}$, for example, 2,500 ohms, to Point Z, thereby discharging capacitors $C_1$ and $C_2$, and causing the voltage at Point Z to decrease. $R_4$, when activated, also simultaneously causes the triggering current to bypass $Z_6$, and pass instead through $Z_5$, for example 14 volts, thereby maintaining the conditions of: Operating the control means, connecting the capacitor discharging circuits and discharging the capacitors $C_1$ and $C_2$, until the voltage at Point Z has been reduced to, for example, 14.5 volts and $Z_5$ ceases to conduct.

The present invention is shown, in FIG. 4, operably connected to an external demand signal, S-5, such as a signal from a float switch in a storage tank, or a like device, which demand signal activates $R_5$, which in turn when activated, and when the control device is in the automatic mode, will connect the outputs of $R_3$ and $R_4$ to the control means, and which when deactivated by the appropriate demand signal will cause the control means to seek a fully shut down position and also disconnect the control device from its 24-volt power supply. In this way, the present invention is fully automatic, such that, when the storage tank (or other similar demand source) is full or above a predetermined value, the control device is disconnected and the process is shut down. When the storage tank or other similar demand source drops to a level which activates the demand signal, $R_5$ is activated which connects the process control device to the power supply so that the process can be operated in the automatic mode, at the desired set-point rate, until the storage tank (or like device which is the source of the system demand signal) reaches its predetermined valve, at which time $S_5$ causes $R_5$ to be deactivated, causing the control device to fully shut down again.

The sensitive coil reed relays $CR_1$ and $CR_2$ are equipped with rectifier diodes across their coils to protect the triggering transistors from inductive surges. $CR_1$ and $CR_2$ are also equipped with 0.1 microfarad arc suppression capacitors across their contacts.

All transistors in the above detailed control circuit are standard commercially available transistors, GE268 or GE269 type or their equivalents. In case the voltage signal generating devices which generate the aforesaid set point and process signals are especially current sensitive, transistors $Q_1$ and $Q_3$ may be changed to Darlington transistors and the resistance of $r_1$ and $r_2$ may be increased to one to two million ohms. Coil relays $CR_1$ and $CR_2$ are General Electric reed relays, catalog number CR120M900A03A, or equivalent. Relays $R_3$ and $R_4$ are also standard commercially available units, being any 120 v. A.C. relay equipped with double pole, double throw contacts. Relay $R_5$ is any of several commercially available 120 v A.C. relays equipped with three pole double throw contacts. Demand switch $S_5$ can be any commercially available switch, such as a float switch or similar device. Relay, $R_5$, may also be connected so that when it is activated, for example by demand switch $S_5$, and the control device is in the automatic mode, the signals from the control device will operate the control means; likewise when $R_5$ is deactivated, the control means will go to their full "shut down" position. The Hand-Automatic Selector, H-A, is also readily available, being any of several three pole double throw toggle switch without a center position. The open-close switch may be any available N.O.—N.O. toggle switch with spring return of the handle to the center position or, alternatively, any of several N.O.—N.O. set of push buttons with a rocker arm between the buttons.

Figure 5:
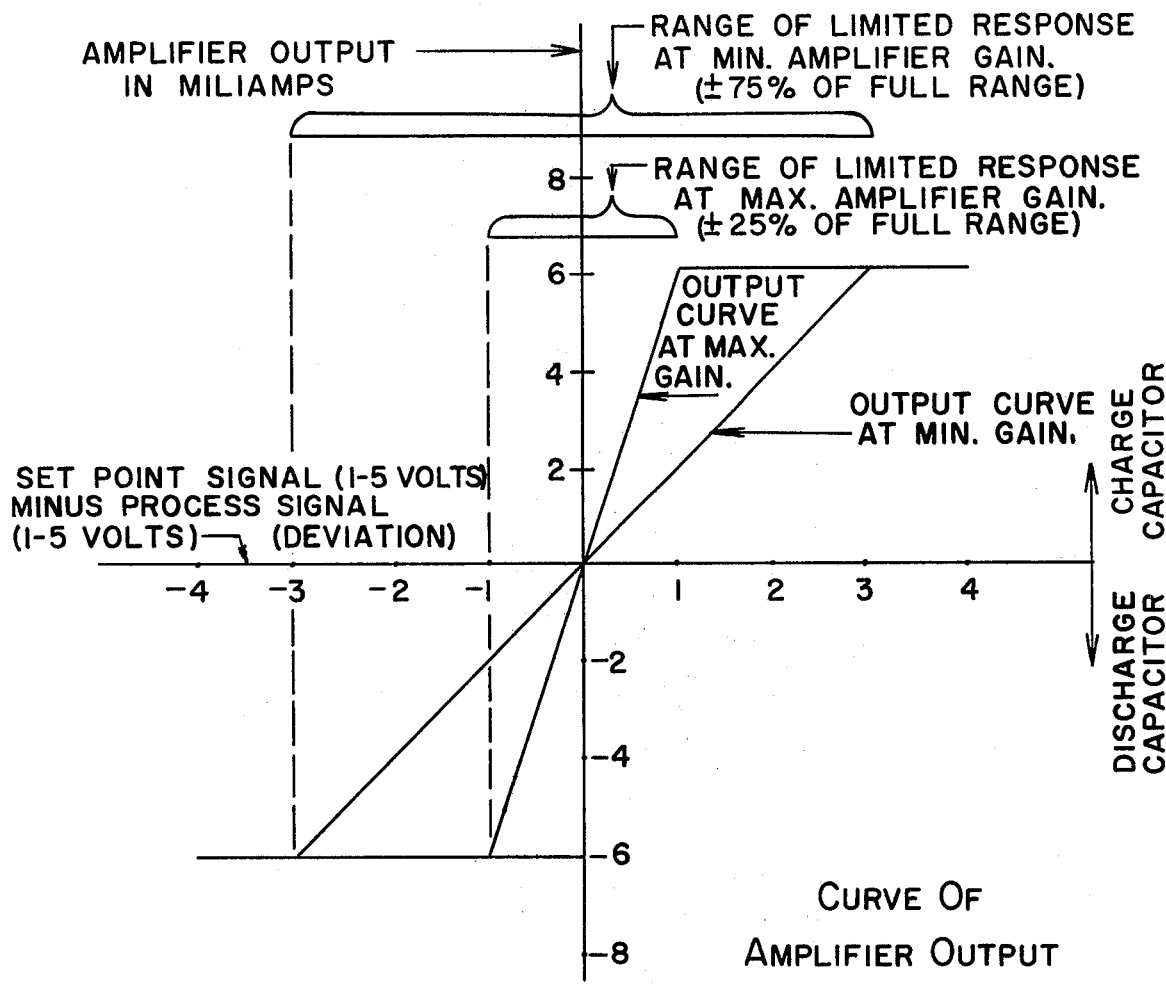
FIG. 5 is a graphical representation showing the relation between deviation of process signal from set point signal and the output signal from the deviation amplifier at both maximum and minimum deviation amplifier gain.

In FIG. 5, the response of the Amplifier to the deviation of the process input signal from the set point input signal is depicted. Since the output current to or from the amplifier will be clipped to equal the trigger current for the circuits activating the controlling means, when the deviation is outside the range of limited response, the control means will operate full time to correct the deviation, but the charge on the capacitors (FIG. 4, $C_1$ and $C_2$) will not change. Inside the range of limited response, the charge on the capacitors will be proportional to the time integral of the deviation multiplied by the gain of the amplifier, less the pre-set tripping currents times the actual time the controlling means is activated. In this situation, the controlling means will operate intermittently with the length of the control means pulses and the frequency thereof decreasing as the deviation approaches zero.

The foregoing embodiment has been proven to be particularly successful in controlling the rate of water flow through a filter by means of valves operated by electric gear motors. Previous attempts to use the presently available control devices have proven unsatisfactory, in that there is widespread hunting while the system is in the automatic mode, and the process set point cannot be significantly altered, nor can the process be started in automatic, without severe bumping. Using presently available process control devices, the system must be started and brought to the set point in the manual mode and then switched to automatic. The present invention, however, controls these large electric power-operated gear motor valves consistently, and without hunting or bumping.

The present invention has been related to way of example to controlling water flow (process variable) by means of electric gear motor-operated valves. However, it should be readily seen that the present invention can be readily adapted to any power operated control means including pneumatic or hydraulic cylinders or other means to operate control means. All that is required to connect the control device embodied in the present invention to either hydraulic or pneumatic powered controlling means is to arrange two pairs of normally-closed solenoid valves so that when one pair is opened the control means operates on the process in one direction (e.g., opens the valve) and where the second pair is opened the control means operates on the process in the opposing direction (e.g., closes the valve).

It will be an easy matter to equip the process control device of the present invention with alternate process set points, so that the process can be automatically stepped, without hunting, to different control points. All that will be required is additional means for accepting the alternative set point signals to be fed into transistor $Q_1$.

Further it should also be understood that any references herein to valve opening and closing as the control means are to be taken as illustrative only, and the operation of the invention herein disclosed is readily adaptible to any and all measurable variables.

What is claimed is:

1. Automatic process control device comprising, in combination:
    first input means for receiving a first signal proportional to a measured variable;
    second input means for receiving a second signal proportional to the desired set point of said measured variable;
    control means to selectively urge said measured variable toward a pre-selected desired value;
    reference signal generating means to provide a reference signal reflective of the difference between said first signal and said second signal;
    deviation signal generating means to receive said reference signal and produce a first or a second deviation signal, each proportional to the reference signal;
    voltage clipping means having input means adapted to receive said first and second deviation signals to limit said first and second deviation signals to selected maximum values;
    deviation signal time-integration and storage means to receive said first and second limited deviation signals and to integrate said first and second limited deviation signals on a time basis and provide a first signal from said deviation signal time-integration and storage means when said time integration of said first and second limited deviation signals is between a pre-selected minimum and a pre-selected maximum value, a second signal from said deviation signal time-integration and storage means when said time integration of said first and second limited deviation signals exceeds said pre-selected maximum value, and a third signal from said deviation signal time-integration and storage means when said time-integration of said first and second limited deviation signals is below said minimum value; and
    switching means responsive to said second and third signals from said deviation signal time-integration and storage means and operably connected to said control means to operate said control means to adjust said measured variable to minimize the difference between said first and second signals and simultaneously urge said time-integration of said first and second limited deviation signals toward a mid-point between said pre-selected maximum and minimum values of said time integration of said first and second deviation signals to produce said first signal from said deviation signal time-integration and storage means.

2. The invention of claim 1 including reference signal generating means comprising:
    power supply means having a pair of leads;
    first and second variable impedance switch means provided in series between said power supply means leads wherein the impedance provided by said first variable impedance switch means is selectively adjusted by said first signal and the impedance provided by said second variable impedance switch means is selectively adjusted by said second signal; and
    output means between said first and second variable impedance switch means to provide said reference signal.

3. The invention of claim 2 where said first variable impedance switch means is a first transistor and said first signal biases the base of said first transistor and said second variable impedance switch means is a second transistor with its base biased by said second signal.

4. The invention of claim 3 including inverter means to reverse the polarity of said second reference signal.

5. The invention of claim 4 wherein said inverter means comprises a third transistor with its base biased by said second variable impedance switch means to provide a signal substantially equal in value but relatively opposite in polarity to the output of said second variable impedance switch means.

6. The invention of claim 1 wherein said deviation signal generating means includes first and second directional switch means connected in series between the leads of said power supply and where said reference signal is applied between said first and second directional switch means, and where said first directional switch means is adapted to permit current flow in a first direction and said second directional switch means is adapted to permit current flow in a second direction, and where said first deviation signal output means to provide said first deviation signal is located between the first of said power supply leads and said first directional switch means and where said second deviation signal output means to provide said second deviation signal is provided between said second power supply lead and said second directional switch means.

7. The invention of claim 1 including a resistance bridge to selectively adjust the impedance of said first and second variable impedance switch means.

8. The invention of claim 7, wherein said first and second variable impedance switch means are transistors each with its base biased by said resistance bridge.

9. The invention of claim 1, wherein said clipping means comprises first zener diode means located between said first deviation signal generating means and said first power supply lead, and second zener diode means located between said second deviation signal generating means and said second power supply lead.

10. The invention of claim 9 including amplifier means to selectively amplify said first and second deviation signals to provide amplified first and second deviation signals.

11. The invention of claim 10 wherein said first and second amplified deviation signals are limited to maximum selected values integrated on a time basis and stored to provide a first or a second amplified and limited time-integrated deviation signal.

12. The invention of claim 1, wherein said deviation signal time-integration and storage means comprises capacitor means located to receive said first and second limited deviation signals and having means to integrate said first and second limited deviation signals on a time basis and provide said first, second or third signal from said deviation signal time-integration and storage means responsive to the time-accumulative difference between said first and second deviation signals.

13. The invention of claim 12 wherein said capacitor means comprises one or more first capacitor means and one or more second capacitor means connected in series between said first and second power supply leads and wherein said deviation signals are applied between said first capacitor means and said second capacitor means and wherein said first deviation signal tends to charge said first capacitor means and simultaneously discharge said second capacitor means, and wherein said second deviation signal tends to charge said second capacitor means and simultaneously discharge said first capacitor means to provide said first, second or third signal from said deviation signal time-integration and storage means reflective of the time of occurrence of said first and said second deviation signals and of the time effect of said charging and discharging of said first and second capacitor means.

14. The invention of claim 13 including first actuator means responsive to said second signal from said deviation signal time-integration and storage means and second actuator means responsive to said third signal from said deviation signal time-integration and storage means, wherein said first actuator means includes first voltage responsive current gate means connected in series with said first actuator means to permit electric current flow to said first actuator means at selected voltage range and otherwise prevent electric current flow to said first actuator means and wherein said second actuator means includes second voltage responsive current gate means in series with said second actuator means to permit electric current flow to said second actuator means at selected voltage range and otherwise prevent electric current flow to said second actuator means, and wherein each of said first and second actuator means is adaptable to actuate said control means in response to said second or said third signal from said deviation signal time-integration and storage means.

15. The invention of claim 14, including sequence control means to permit actuation of only one of said first and second actuator means at any given time.

16. The invention of claim 14 wherein said first and second voltage responsive current gate means includes one or more zener diodes.

17. The invention of claim 14 wherein said first and second actuator means each includes actuator switch means responsive to respective actuation of said first and second actuator means to apply a selected signal upon said deviation signal time-integration and storage means to urge said deviation signal and time-integration storage means to provide said first signal from said deviation signal time-integration and storage means.

18. The invention of claim 17 wherein said actuator switch means includes resistance means cooperative with said capacitor means of said deviation signal time-integration and storage means to provide operation of said first and second actuator means time responsive to the rate at which said deviation signal time-integration and storage means is urged to provide said first signal from said deviation signal time-integration and storage means.

19. The invention of claim 4 including adjusting means to minimize distortion of said second signal in said inverter means.

20. The invention of claim 1 including selector means to permit selection of alternative second signals.

21. The invention of claim 1 including override means allowing said automatic process control device to be operated manually.

22. The invention of claim 2 including system actuating switch means responsive to selected conditions to selectively actuate said power supply leads.

23. Method of controlling a process variable, comprising the steps of:
receiving a first and a selected one of one or more second signals where said first signal is reflective of the value of a process variable which is desired to be controlled and said second signals are reflective of one or more desired values of said process variable;
converting said first and second signals into a first reference signal proportional to said first signal and a second reference signal proportional to said second signal;
reversing the polarity of said second reference signal to produce a third reference signal equal to but of opposite voltage to said second reference signal;
algebraically comparing said first reference signal and said third reference signal to produce one of two deviation signals, said first deviation signal being produced if said first reference signal and said third reference signals are in a first algebraic relation and said second deviation signal being produced if said first reference signal and said third reference signal are in a second algebraic relation;

amplifying said first and said second deviation signals to produce first and second amplified deviation signals;

limiting the maximum value of said first and second amplified deviation signals each to a maximum selected value;

integrating said first and second amplified and limited deviation signals on a time basis and storing said first and second amplified and limited deviation signals in deviation signal time-integration and storage means, the discharge value of which is selected to substantially equal said maximum value of said first and second amplified and limited deviation signals, said deviation signal time-integration and storage means arranged to provide a first signal from said deviation signal time-integration and storage means which will not cause discharge of said deviation signal time-integration and storage means when said first and second signals are in a first relation of substantially equivalent value and said time-integration of said first and second amplified and limited deviation signals is substantially equal, and provide a first trigger signal from said deviation signal time-integration and storage means when said first and second signals are in a second relation and said time-integration of said first and second amplified and limited deviation signals are in a second relation to permit said first amplified and limited deviation signal to discharge said deviation signal time-integration and storage means and produce said first trigger signal, and provide a second trigger signal from said deviation signal time-integration and storage means when said first and second signals are in a third relation and said time-integration of said first and second amplified deviation and limited signals is in a third relation to permit said second amplified and limited deviation signal to discharge said deviation signal time-integration and storage means to produce said second trigger signal; and receiving said first and second trigger signals to operate control means upon said process variable in a first direction when said first trigger signal is produced and simultaneously produce a first tripping signal to urge said deviation signal time-integration and storage means toward a status to provide said first signal from said deviation signal time-integration and storage means and to operate said control means upon said process variable in a second direction when said second trigger signal is produced and simultaneously produce a second tripping signal to urge said deviation signal time-integration and storage means toward a status to provide said first signal from said deviation signal time-integration and storage means.

* * * * *